Figure 1:
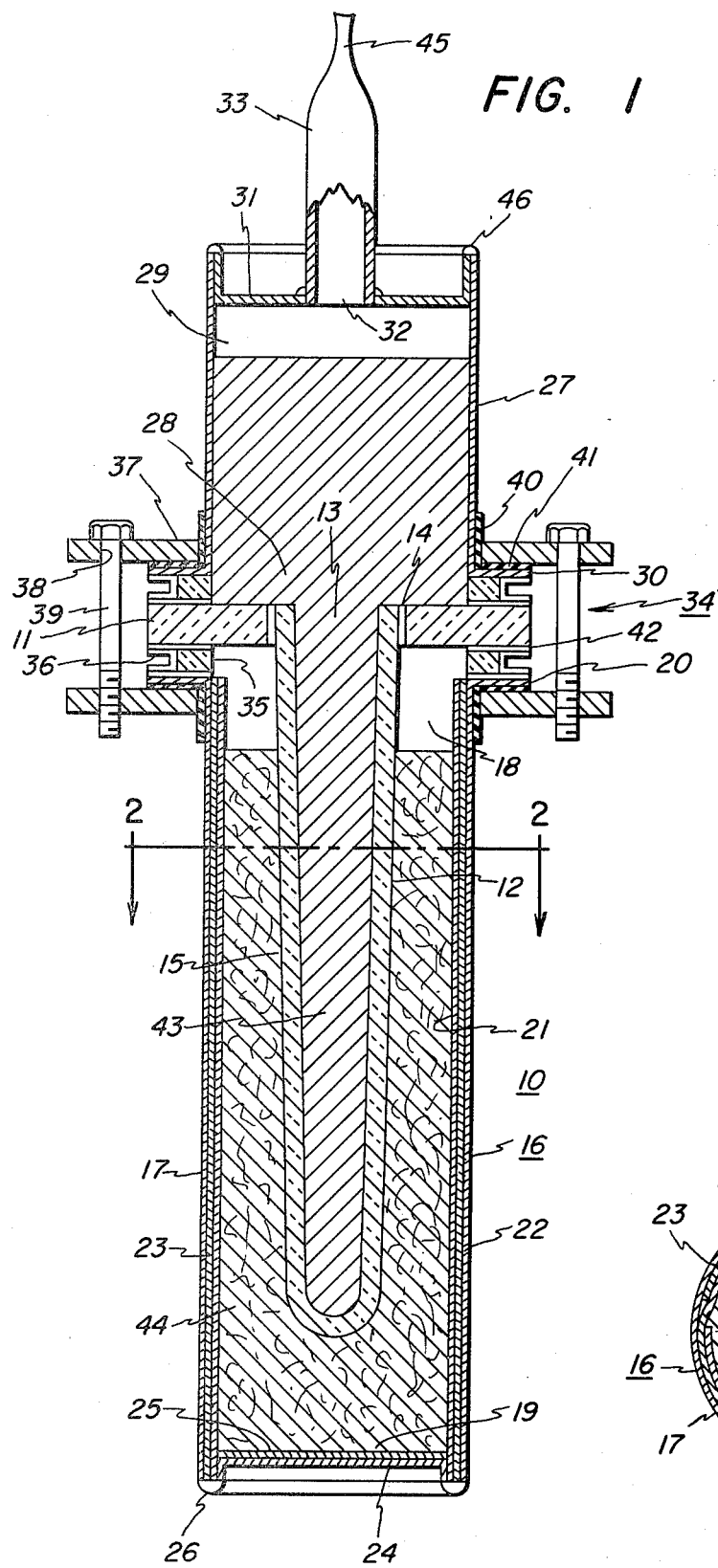

United States Patent [19]
Chatterji et al.

[11] 4,287,664
[45] Sep. 8, 1981

[54] SULFUR ELECTRODE CONTAINER AND METHODS OF MANUFACTURE

[75] Inventors: Debajyoti Chatterji, Latham; Dong-Sil Park, Schenectady, both of N.Y.

[73] Assignee: Electric Power Research Institute, Inc., Palo Alto, Calif.

[21] Appl. No.: 87,402

[22] Filed: Oct. 22, 1979

Related U.S. Application Data

[62] Division of Ser. No. 895,141, Apr. 10, 1978, Pat. No. 4,209,573.

[51] Int. Cl.³ .............................................. H01M 2/02
[52] U.S. Cl. ................................................... 29/623.2
[58] Field of Search ........................... 29/623.1, 623.2; 429/104, 163, 164, 176; 228/184, 198; 220/63 R, 66, 67, 449, 450, 456

[56] References Cited

U.S. PATENT DOCUMENTS

| 3,140,006 | 7/1964 | Nelson | 220/426 |
|---|---|---|---|
| 3,946,751 | 3/1976 | Breiter et al. | 429/104 |
| 3,959,013 | 5/1976 | Breiter | 429/104 |
| 4,024,320 | 5/1977 | Gibson | 429/104 |
| 4,048,391 | 9/1977 | Tilley et al. | 429/104 |
| 4,084,040 | 4/1978 | King | 429/185 |
| 4,125,682 | 11/1978 | Bordet et al. | 429/104 |
| 4,131,226 | 12/1978 | Breiter et al. | 29/623.5 |

*Primary Examiner*—Daniel C. Crane
*Attorney, Agent, or Firm*—Jane M. Binkowski; James C. Davis, Jr.; Leo I. MaLossi

[57] ABSTRACT

A sulfur electrode container is described which includes a metallic liner in foil form with at least two full windings within an outer casing. The liner is substantially corrosion resistant to liquid sulfur, while the outer casing is readily corroded by liquid sulfur. One method of making a sulfur electrode container includes forming a metallic liner in foil form into at least two full windings within the outer casing. Another method of making a sulfur electrode container includes wrapping a metallic liner in foil form into at least two full windings around a sulfur-carbon plug, after which the plug surrounded by the foil, is positioned within an outer casing.

6 Claims, 2 Drawing Figures

U.S. Patent      Sep. 8, 1981      4,287,664

SULFUR ELECTRODE CONTAINER AND METHODS OF MANUFACTURE

This is a division, of application Ser. No. 895,141, filed Apr. 10, 1978 now U.S. Pat. No. 4,209,573.

This invention relates to a sulfur electrode container and to methods of forming such containers and, more particularly, to such a container including a metallic liner in foil form with at least two full windings within an outer casing and to methods of forming such containers.

Sodium-sulfur cells, which operate at elevated temperatures, are known in the prior art as, for example, described in U.S. Pat. No. 3,946,751 issued Feb. 18, 1975, under the title "Cell Casing with a Hermetic Mechanical Seal and a Hermetically Sealed Sodium-Sulfur Cell".

In U.S. Pat. No. 3,959,013, there is described a cathode cell casing portion, a cell casing and a hermetically sealed sodium-sulfur cell. A cathode cell casing portion is formed from a metal selected from aluminum, steel or iron-nickel- cobalt alloys. A corrosion resistant and electronically conductive layer adheres to the inner surface of the container, which layer is selected from the class consisting of molybdenum and graphite. One suitable method of applying and adhering the molybdenum layer to the inner surface of the cell casing portion is to plasma spray such surfaces with a thin layer of molybdenum. The above-identified patents are assigned to the General Electric Company.

In U.S. Pat. No. 3,140,006, there is described a pressure vessel for containing hydrogen or mixtures thereof. In column one, lines 24-30, there is pointed out that vessels for containing hydrogen are known which have a plurality of layers or sections wherein only the inner layer or layers are resistant to hydrogen and the outer section or sections are of carbon steel.

The patent describes an improved construction for a pressure vessel having a suitable opening for admitting a fluid which comprises at least two sections which are not metallurgically bonded, either directly or indirectly, and which have a gas-flow passage therebetween. The inner section is or contains a layer of material which is resistant to deterioration by gas, such as hydrogen absorbed in the metal. The outer section has weep holes inter-connecting the inner surface thereof with the outside of the vessel. The outer section may then be constructed of carbon steel. This description is set forth in column two, lines 6-15 and in column three, lines 56-59. In column three, lines 43-47, it is pointed out that the shell contains an inner section consisting of two layers which may be bonded together as by rolling the layers of different metals to form a unitary sheet. The bonding may also be accomplished by welds.

As opposed to the above patents, the present application describes and claims a structure in which an inner metallic liner is provided in foil form with at least two full windings within and in contiguous relation with the inner surface of an outer casing. The present sulfur electrode container does not have and would not function with weep holes in the outer casing as described in U.S. Pat. No. 3,140,006.

In U.S. Pat. application Ser. No. 837,381, filed Sept. 28, 1977, under the title "Sulfur Electrode Container Construction and Method of Manufacture", now U.S. Pat. No. 4,131,226 there is described a plurality of sulfur electrode container constructions characterized by mild steel and discrete anti-corrosive liners disposed within the containers and method of manufacturing each. A discrete liner of a material substantially non-corrodible by liquid sulfur is disposed within a container in substantially contiguous relation with respect to the inner wall of the container for sealing the same from the liquid sulfur therein. A flexible anti-corrosion foil such as 347 stainless steel is rolled as a cladding into the shape of a cylindrical liner so that it fits snugly into the open ended rigid container. The edge margins of the foil are disposed in slightly overlapping relation. The liner can be spot welded to the container along its overlapping edge margins. This U.S. application is assigned to the Electric Power Research Institute, Inc., subject to the reservation of license rights to the General Electric Company.

Our present invention is directed to providing an improved sulfur electrode container and improved methods of manufacturing such containers over the above-identified patents and patent application in that there is utilized a metallic liner in foil form with at least two full windings within the outer casing of the container.

The primary objects of our invention are to provide an improved sulfur electrode container and improved methods of manufacturing such containers wherein a self-sealing effect is produced by the liner thereby minimizing creeping of the corrosive sulfur or vapor between the liner and the outer casing of the container.

In accordance with one aspect of our invention, a sulfur electrode container includes a metallic liner in foil form with at least two full windings within an outer casing. The liner is substantially corrosion resistant to liquid sulfur, while the outer casing is readily corroded by liquid sulfur.

Figure 2:
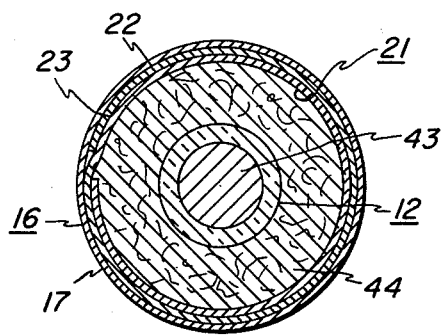

These and various other objects, features and advantages of the invention will be better understood from the following description taken in connection with the accompanying drawing in which:

FIG. 1 is a sectional view of a sodium-sulfur cell with a sulfur electrode container made in accordance with our invention; and FIG. 2 is a sectional view through the sulfur electrode container of FIG. 1 taken on line 2—2 thereof.

In FIG. 1 of the drawing, there is shown a sodiumsulfur cell 10 of the type described in above-mentioned U.S. Pat. No. 3,946,751 with the improved sulfur electrode container of the present invention. Cell 10 has a ceramic ring 11, an inner casing of a solid sodium ion-conductive material 12 with on open end 13, and a glass seal 14 sealing a portion of the outer wall 15 of the inner casing 12 adjacent its open end 13 within and to the ceramic ring 11. An improved sulfur electrode container 16 has an outer metallic casing 17 readily corroded by liquid sulfur, with opposite open ends 18 and 19 and a flange 20 at open end 18 surrounding inner casing 12 and spaced therefrom.

A metallic liner 21 in foil form has two full windings 22 and 23 within casing 17. Liner 21 of 347 stainless steel is substantially corrosion resistant to liquid sulfur. The outer surface of liner 21 is in substantially contiguous relation to the inner surface of outer casing 17. A metallic end cap 24 with a layer of liner foil 25 disposed on its inner surface is fitted and sealed as by welding at 26 within and adjacent open end 19 of outer casing 17. A sodium container 27 has opposite open ends 28 and 29 and a flange 30 at open end 28. Sodium container 27 extends in an opposite direction to sulfur container 16.

A metallic end cap 31 for opposite open end 29 of sodium container 27, has a fill opening 32 in end cap 29, and a fill tube 33 affixed to end cap 29 and in communication with fill opening 32.

Sulfur and sodium metallic containers 16 and 27 are shown joined to ceramic ring 11 by a hermetic mechanical seal shown generally at 34 thereby forming a continuous container. Seal 34 comprises a pair of retainer rings 35, each of which is positioned between ceramic ring 11 and an adjacent flange 20 or 30 of containers 16 and 27, respectively. A pair of "C" shaped sealing rings 36 are positioned similarly to rings 35 but surround exteriorly and are spaced from rings 35. The open portion of each "C" shaped sealing ring faces outwardly. A retaining collar 37 is positioned around each container and adjacent to the opposite surface of the casing flange. Each collar 37 has at least a pair of and preferably a plurality of apertures 38 therethrough. The collars are positioned so that the respective apertures 38 are aligned. Threaded fasteners 39, each passing through a pair of associated apertures, are employed to tighten the mechanical seal to produce a hermetic mechanical seal 34. Electrical insulation 40 in the form of fiberglass tape is shown wound around the exterior surface of containers 16 and 27 adjacent the respective flanges 20 and 30 to prevent short-circuiting of the cell by seal 34. Electrical insulation 41, in the form of an inorganic fiber cloth ring is positioned between each flange 20 and 30 and the surface of each assoiated collar 33 to prevent short-circuiting of the cell by seal 34. While the opposite surfaces of ceramic ring 11 are smooth to insure a good seal, there is shown also a preferred ring 42 of aluminum foil between the opposite surface of retainer ring 35 and sealing ring 36 and the associated surface of ceramic ring 11 to provide a smoother surface. Hermetic mechanical seal 34 is shown in its tightened or hermetic position. A negative electrode 43 of sodium metal is positioned preferably within inner casing 12 and partially within sodium container 27. A positive electrode 44 of a sulfur-carbon plug is positioned preferably within outer casing 17 and is in contact with outer wall 15 of inner vessel 12 and with the interior liner 21. A void volume is provided between ceramic ring 11 and the upper portion of positive electrode 44 to provide space for reactant during operation of the cell. Fill tube 33 is shown closed in any suitable manner such as by a weld 45. End cap 31 is affixed to container 29 as by welding at 46. The resulting structure is a hermetically sealed sodium-sulfur cell.

In FIG. 2 of the drawing, there is shown a sectional view through the improved electrode container of FIG. 1 taken on line 2—2 thereof. The same numerals are used in the description of FIG. 2 as were employed in the description of FIG. 1. Sulfur electrode container 16 has an outer metallic casing 17 surrounding inner casing 12 and spaced therefrom. Metallic liner 21 in foil form has two full windings 22 and 23 within casing 17. The outer surface of liner 21 is in substantially contiguous relation to the inner surface of outer casing 17. Negative electrode 43 of sodium metal is positioned within inner casing 12. Positive electrode 44 of a sulfur-carbon plug is positioned within outer casing 17 and in contact with outer wall 15 of inner vessel 12.

We found that we could form an improved sulfur electrode container which includes an outer metallic casing readily corroded by liquid sulfur, such as a low carbon steel. Another suitable outer metal casing material is nickel. The outer casing has opposite open ends. It may be desirable, depending on the type of sulfur container and on the method of joining such container to form a sodium-sulfur battery, to provide an outwardly or inwardly extending flange to one open end of the casing. As it is shown in both FIGS. 1 and 2 of the drawing, an outwardly extending flange is employed. Such a flange configuration is used in view of the hermetic mechanical seal employed in the sodium-sulfur battery in which it is used. Since other sealing methods are available for affixing the sulfur electrode container as a portion of the sodium-sulfur cell, such an outwardly extending flange might not be required. However, we will describe an embodiment of the electrode container of our invention which can be employed in the cell shown in the figures of the drawing and described above. A metallic liner in foil form with at least two full windings, is provided within the outer casing. The liner is substantially corrosion resistant to liquid sulfur. Suitable materials for the liner include various stainless steels such as 347 stainless steel and molybdenum, and nickel-chronium alloys such as a 50% nickel-50% chromium alloy.

We found that at least two full windings to form the metallic liner is required to eliminate or substantially reduce the creeping of the corrosive sulfur or its vapor between the outer surface of the liner and the inner surface of the container. Our present liner, by having at least two full windings offers a self-sealing effect. It is preferred that the liner be co-extensive with the length of the outer casing. The outer surface of the liner is in substantially contiguous relation with respect to the inner surface of the outer casing. A metallic end cap is adapted to fit and thereby sealed within and adjacent one open end of the casing. In the present embodiment, the metallic end cap will fit into the open end opposite the open end having a flange thereat. The inner surface of the end cap is substantially corrosion resistant to liquid sulfur. Thus, the end cap or at least that portion of the end cap, other than its inner surface, can be made of the same metal as the outer casing. The inner surface of the end cap can be formed of the same material as the liner or at least one layer of the liner foil can be disposed on the inner surface of the end cap thereby making at least the inner surface of the end cap substantially corrosion resistant to liquid sulfur. If desired, at least one weld spot is employed to tack the liner to the inner wall of the casing. In the configuration of the sodium-sulfur cell shown in the figures of the drawing, a sulfur-carbon plug is fitted within the sulfur electrode container. The sulfur-carbon plug comprises generally a pre-cast cylindrical body of sulfur and carbon mat with a central opening. The carbon mat is impregnated with sulfur. The sulfur-carbon plug is positioned within sulfur electrode container so that its outer surface is in contact with the inner surface of the liner, its inner surface is in contact with the outer surface of solid sodium ion-conductive tube and its bottom end, as viewed in FIG. 1, is in contact with the inner surface of the end cap. The end cap is fitted within the bottom opening of the sulfur electrode container as viewed in FIG. 1, so that the edges of the end cap are in contact with the inner surface of the liner. The end cap is sealed to the outer casing and liner along its outer periphery, as for example by welding.

The sulfur electrode container is formed in one method by providing an outer metallic casing having opposite open ends and outwardly extending flanges at one open end, which casing is readily corrodible by liquid sulfur. A metallic liner which is substantially corrosion resistant to liquid sulfur is provided in foil form. The foil is formed into at least two full windings within the outer casing with the outer surface of the liner in substantially contiguous relation with respect to the inner surface of the outer casing. A metal end cap is provided which is adapted to fit and be sealed within and adjacent one open end of the casing. The end cap is provided with at least its inner surface substantially corrosion resistant to liquid sulfur. Although not shown in the embodiment being described, the liner can be welded whereby one weld spot tacks the liner to the inner wall of the casing. This method includes further fitting the end cap within and adjacent the bottom opening of the sulfur electrode container as viewed in FIG. 1 of the drawing, so that the edges of the end cap are in contact with the inner surface of the liner. The end cap is sealed to the outer casing and liner along its outer periphery, as for example by welding. This method includes further disposing at least one layer of the liner foil on the inner surface of the end cap so that the inner surface of the end cap is substantially corrosion resistant to liquid sulfur.

The sulfur electrode container is formed in another method by first providing a sulfur-carbon plug. A metallic liner in foil form, which is substantially corrosion resistant to liquid sulfur is then wrapped into at least two full windings around the sulfur-carbon plug. An outer metallic casing having opposite open ends, readily corrodible by liquid sulfur, is provided. The sulfur-carbon plug surrounded by at least two full windings of the foil is positioned within the outer casing with the outer surface of the liner in substantially contiguous relation with respect to the inner surface of the outer casing. A metallic end cap is provided which is adapted to fit and be sealed within and adjacent one open end of the casing. The end cap is provided with at least its inner surface substantially corrosion resistant to liquid sulfur. The method includes also fitting the end cap within the bottom opening of the sulfur electrode container as viewed in FIG. 1 of the drawing, so that the edges of the end cap are in contact with the inner surface of the liner. The method includes further sealing the end cap to the outer casing and liner along its outer periphery as, for example, by welding. The method includes disposing at least one layer of the liner foil on the inner surface of the end cap whereby the inner surface of the end cap is substantially corrosion resistant to liquid sulfur.

As shown in FIGS. 1 and 2 of the drawing, a hermetic mechanical seal is employed to seal the sulfur electrode container in the sodium-sulfur cell. It will be appreciated that there are other methods of sealing the sulfur electrode container in a sodium-sulfur cell, such as sealing the flange of the sulfur electrode container to the ceramic ring by means of a glass seal or by thermocompression bonding. Thus, it will be appreciated that depending on the method of sealing the sulfur electrode container in the sodium-sulfur cell, the metal end cap can initially or subsequently be sealed to the liner and outer casing. Thus, for example, in the configuration shown in FIGS. 1 and 2 of the drawing, the outer metallic casing of the sulfur electrode container without the end cap can be hermetically sealed to the ceramic ring. The metallic liner can then be inserted within the outer casing. The pre-formed sulfur-carbon plug can then be inserted within the liner to surround the sodium ionconductive electrolyte tube. Thereafter, the end cap can be fitted and sealed to the outer casing and liner. Using the same configuration as shown in FIGS. 1 and 2 of the drawing, the outer metal casing can have its liner inserted therein. The end cap is then sealed to the outer casing and liner. The sulfur-carbon plug can then be inserted within the liner from the opposite open end of the sulfur electrode container. The sulfur electrode container, including the sulfur-carbon plug, can then be hermetically sealed by means of its flange to the ceramic ring in the sodium-sulfur cell.

Examples of sulfur electrode containers and method of manufacturing such containers made in accordance with our invention are set forth below:

EXAMPLE I

A sulfur electrode container was formed as above described and as is shown in FIGS. 1 and 2 of the drawing by providing an outer metallic casing of low carbon steel having opposite open ends, which container is readily corrodible by liquid sulfur. An outwardly extending flange is provided at one open end of the outer casing. A 2 mil. thick 347 stainless steel foil, which is substantially corrosion resistant to liquid sulfur, was formed into two full windings within the outer casing thereby providing a metallic liner. The outer surface of the liner was in substantially contiguous relation with respect to the inner surface of the outer casing. A metallic end cap of low carbon steel having one layer of liner foil disposed on its inner surface was fitted within and adjacent the open end of the casing opposite the open end with the flange so that the edge of the end cap was in contact with the inner surface of the liner. The end cap was sealed by welding the cap to the liner and outer casing. The resulting device was a sulfur electrode container made in accordance with our invention.

EXAMPLE II

A sulfur electrode container is assembled by providing a sulfur-carbon plug with a central opening extending partially therethrough. A 2 mil. thick 347 stainless steel foil, which is substantially corrosion resistant to liquid sulfur is wrapped around the sulfur-carbon plug to provide two full windings of the foil around the plug. An outer metallic casing of 2 mil. thick 347 stainless steel foil is provided. The casing, which is readily corrodible by liquid sulfur, has opposite open ends and a flange at one open end. A metallic end cap of low carbon steel is fitted within and adjacent the open end opposite the open end with the flange. The end cap has one layer of liner foil disposed on its inner surface. The end cap is sealed to the outer casing by welding. The sulfur-carbon plug surrounded by the two full windings of foil are positioned within the outer casing with the outer surface of the liner in substantially contiguous relation with respect to the inner surface of the outer casing. This device is a sulfur electrode container made in accordance with our invention.

EXAMPLE III

The sulfur electrode container of Example I was employed in a sodium-sulfur cell of the type described above and shown in FIGS. 1 and 2 of the drawing. The cell had a ceramic ring of alpha alumina, an inner casing of solid sodium and beta alumina in tube form with one open end, and a glass seal sealing a portion of the outer wall of the inner casing adjacent its open end within and to the ceramic ring. A sodium container of metal had opposite open ends and a flange at one open end. An end cap was welded to the open end of the sodium container opposite to the open end having a flange. A fill opening was provided in the end cap and a fill tube affixed to the end cap and in communication with the fill opening.

A ring of aluminum foil was positioned on the upper surface of the ceramic ring. A retainer ring is positioned on the upper surface of the aluminum foil and surrounded by "C" shaped sealing ring with its opening facing outwardly. The flange of the sodium container is positioned on the upper surface of both the retainer ring and the "C" shaped sealing ring. Fiberglass tape was wound around the exterior surface of the sodium container adjacent its flange. An inorganic fiber cloth ring was positioned around the upper surface of the flange of the sodium container.

The sulfur electrode container of Example I had a sulfur-carbon plug inserted therein through its open end. The sulfur electrode container, with its plug positioned therein surrounded the beta-alumina tube, whereby the tube was fitted into the opening within the sulfur-carbon plug. As described above, the sulfur-carbon plug was positioned on the opposite surface of the ceramic ring in the same manner as was the sodium container. A retaining collar was positioned around each container and adjacent to the opposite surface of the casing flange. Each collar had a plurality of apertures therethrough. The collars were positioned so that the respective apertures were aligned. A threaded fastener passed through each pair of associated apertures. These fasteners were then tightened to provide a hermetic mechanical seal for the cell. The threaded fasteners were tightened to a pressure of about 300 lbs. to provide a complete hermetic mechanical seal.

EXAMPLE IV

The cell of Example III was positioned in a furnace and heated to a cell operating temperature of 315° C. The cell was charged and discharged over 80 cycles in a completely satisfactory manner. Subsequently, the cell was disassembled and the inner surface of the liner and of the outer casing of the sulfur electrode container were examined. The container showed only nominal amounts of corrosion products.

While other modifications of the invention and variations thereof which may be employed within the scope of the invention have not been described, the invention is intended to include such as may be embraced within the following claims:

What we claim as new and desire to secure by Letters Patent of the U.S. is:

1. A method of producing a sulfur electrode container which consists essentially of providing an outer metallic casing having opposite open ends readily corroded by liquid sulfur, providing a metallic foil substantially corrosion resistant to liquid sulfur, forming the foil into at least two full windings within said casing producing a self-sealing protective liner in situ in said casing, said liner being contiguous to and coextensive with the inner surface of said casing, and sealing one open end only of the casing with a metallic end cap fitted within and adjacent said open end of said casing, said end cap having an inner surface substantially corrosion resistant to liquid sulfur.

2. A method of producing a sulfur electrode container as in claim 1, in which at least one weld spot tacks the liner to the inner wall of the casing.

3. A method as in claim 1 in which at least one layer of said foil is disposed on the inner surface of the end cap.

4. A method according to claim 1 wherein the foil is formed into at least two full windings producing the selfsealing liner for the inner surface of said casing and said liner is positioned within said casing.

5. A method of producing a sulfur electrode container which consists essentially of providing a sulfur-carbon plug, providing a metallic foil substantially corrosion resistant to liquid sulfur, wrapping the foil into at least two full windings around the sulfur-carbon plug producing a self-sealing protective liner, providing an outer metallic casing having opposite open ends readily corrodible by liquid sulfur, positioning the liner-protected sulfur-carbon plug within the casing with the liner substantially contiguous to and coextensive with the inner surface of the casing, and sealing one open end only of the casing with a metallic end cap fitted within and adjacent said open end of said casing, said end cap having an inner surface substantially corrosion resistant to liquid sulfur.

6. A method of forming a sulfur electrode container as in claim 5, in which at least one layer of the liner foil is disposed on the inner surface of the end cap.

* * * * *